United States Patent Office 3,605,934
Patented Sept. 20, 1971

3,605,934
STEERING MECHANISM FOR MOTOR VEHICLES
Barry John Millard, Earley, near Reading, England,
assignor to Adwest Engineering Limited
Filed June 30, 1969, Ser. No. 837,858
Claims priority, application Great Britain, July 1, 1968,
31,345/68
Int. Cl. B62d 3/12, 5/06
U.S. Cl. 180—79.2R                               5 Claims

ABSTRACT OF THE DISCLOSURE

Steering mechanism for a motor vehicle, the mechanism comprising a rod member adapted to be fixedly secured to a motor vehicle, a casing slidable on the rod member, a toothed rack carried by the casing and connectable with the steerable road wheels of a motor vehicle, and a pinion in meshing engagement with the toothed rack and connectable with the steering control of a motor vehicle, the pinion being rotatable to effect longitudinal movement of said rack and said casing relative to the rod member.

---

Figure 1:
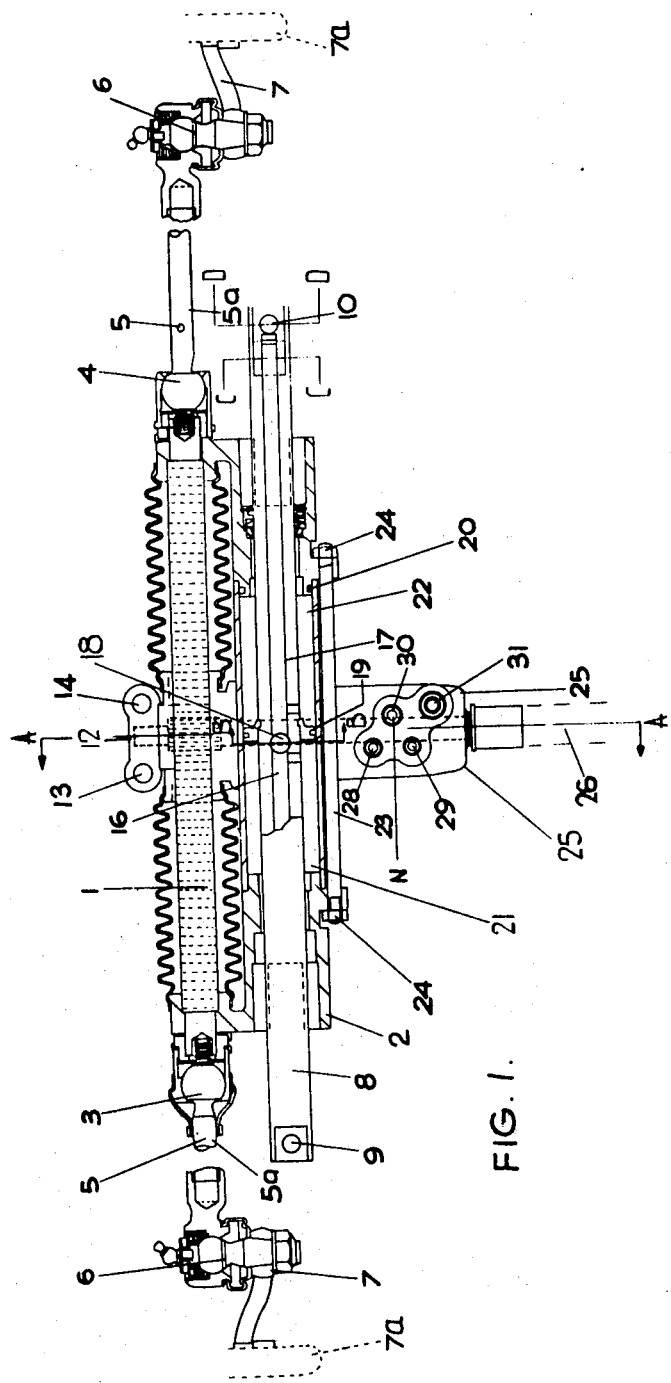

This invention relates to motor vehicle steering mechanism and more particularly to rack and pinion steering mechanism. The invention is applicable to both manually operated steering mechanism and to power assisted steering mechanism.

In a known construction of rack and pinion steering mechanism, the rack is slidable in a casing by rotation of the pinion, the ends of the rack projecting from the casing and being connected to joints, e.g. ball joints, which form part of a steering linkage to the steerable road wheels. The distance between the two joints at the ends of the rack is determined by: the amount the rack is designed to be moved by the pinion in each longitudinal direction; the fact that no toothed part of the rack can be allowed to pass through an end of the casing; and, in the case where the cylinder incorporates a power piston for power assistance of the rack, by the fact that no toothed part of the rack can be allowed to pass through any seal incorporated in the cylinder in order to contain the hydraulic servo fluid. The result is that the two joints cannot be positioned closer to one another than a certain distance dictated by these factors.

The present invention is concerned with the provision of a rack and pinion steering mechanism, power assisted or manual, which will allow the distance between these joints to be reduced and thus give greater freedom in the design of the associated steering linkage and also in packaging and fitting the steering mechanism within particular vehicles.

According to the present invention there is provided a motor vehicle steering mechanism comprising a toothed rack 1 adapted to be connected with the steerable road wheels and a pinion 11 engaged with the toothed rack and adapted to be connected to a steering wheel or the like characterised in that an elongate member 2 is disposed parallel to the toothed rack 1 and there is a connection between the toothed rack and the elongate member so that rotation of the pinion 11 causes the rack 1 and the elongate member to move in unison, and either the rack or the elongate member is adapted to carry a joint 3, 4 at one or both ends which is adapted to be connected with the steerable road wheels.

Conveniently the said elongated member is in the form of a casing 2 and the toothed rack 1 is mounted within the casing to move in unison with the casing and the casing is adapted to have a joint mounted on one or both of its ends for connection with steerable road wheels, and the casing 2 is slidable along a rod 8 adapted to be mounted directly or indirectly on a chassis or body of a vehicle.

Figure 2:
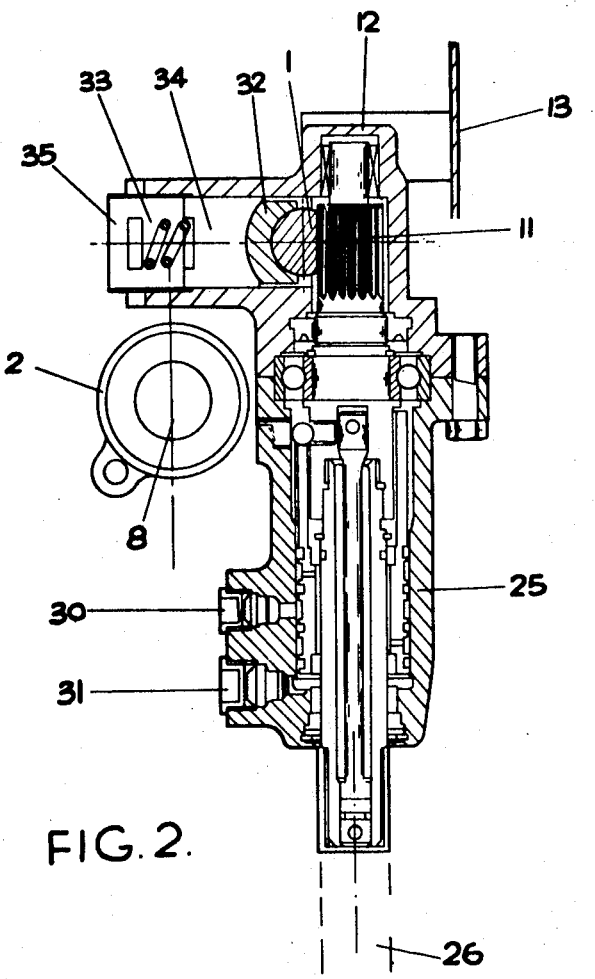
Figure 3:
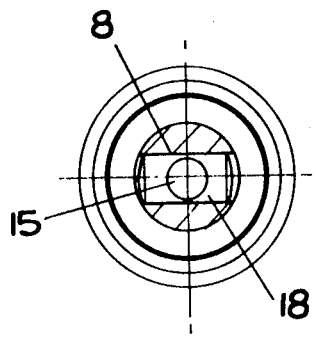
Figure 4:
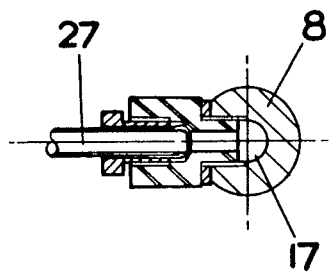
Figure 5:
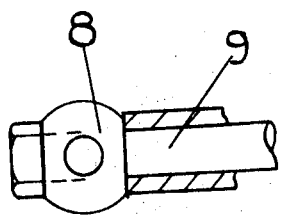

In order that the invention may be more clearly understood one specific constructional example thereof will now be described with reference to the accompanying drawings, in which:

FIG. 1 is a sectional elevational view of one embodiment;
FIG. 2 is a cross-sectional view on the line A—A of FIG. 1;
FIG. 3 is a cross sectional view on the line B—B of FIG. 1;
FIG. 4 is a cross sectional view of the line C—C of FIG. 1; and
FIG. 5 is a cross sectional view on the line D—D of FIG. 1.

In the drawings, particularly FIG. 1, a toothed rack 1 is mounted within a first casing 2 to move in unison with the latter, and has two inner ball-joints 3 and 4 mounted on its ends. Each inner ball-joint 3 and 4 is connected by a pin 5 and tie rod 5a to an outer ball-joint 6 which in turn is connected to a wheel lever 7 connected to the steerable road wheels 7a of a motor vehicle.

The first casing 2 constitutes an elongate member disposed parallel to the rack and is slidable along a rod 8 which is adapted to be mounted at points 9 and 10 to a vehicle chassis or body, either directly or through rubber blocks.

A pinion 11 (FIG. 2) engages the rack 1 and is rotatably mounted in a second casing 12 which is also adapted to be mounted at points 13 and 14 to the vehicle chassis or body, either directly or through rubber blocks. Thus, rotation of the pinion effects longitudinal movement of the rack 1 and first casing 2 relatively to the rod 8 and second casing 12.

In this embodiment the rack is power servo assisted.

Thus the rod 8 is hollow and it's bore 15 is divided into two passages 16 and 17 by a pin 18. A seal 19 is carried by the rod to form a power piston which divides a cylindrical portion 20 of the casing 2 into two chambers 21 and 22. The left and right hand ends of the casing 2 and the cylinder 20 are held together by a bolt 23 and nuts 24.

Hydraulic servo fluid under pressure is supplied to either chamber 21 or 22 through a control valve 25 (FIGS. 1 and 2) interposed between the pinion 11 and the lower end of the steering column 26 (FIG. 2) connected to a steering wheel or the like (not shown). In this embodiment the control valve has the construction described and claimed in British Pat. No. 958,558 but other types of valves could be used including that described and claimed in British Pat. No. 818,483, and functions in a manner known per se.

The passages 16 and 17 are connected to pipes 27, in the manner shown in FIG. 4, which in turn are connected to fluid outlets 28 and 29 of the valve 25. The hydraulic fluid is supplied from an engine driven pump (not shown) to a valve inlet 30 and exhausted from a valve outlet 31.

In operation, rotation of the steering column 26 clockwise causes movement of the rack 1, and casing 2, to the right, as viewed in FIG. 1. Simultaneously, as well known per se, the clockwise movement of the steering column causes a rotor within the valve 25 to open communication of the chamber 22 and pressurise the latter thus also urging the rack to the right. Similarly anti-clockwise rotation causes pressurisation of the chamber 21 and leftward movement of the rack. In the event of failure of the serve assistance, the rack will be moved solely by the mechanical connection through the pinion 11.

The rack 1 is urged into engagement with the pinion 11 by a pressure pad 32 (FIG. 2), which in turn is subjected to the pressure of a compression spring 33 through a seating 34, the spring 33 being retained by a threaded plug 35.

The pad 32 has a cylindrical surface in contact with a similar cylindrical section edge surface of the rack 1 (FIG. 2) so that when setting the unit for installation in a vehicle the second casing 12 can be rotated with respect to the rack 1 and first casing 2.

As can be seen in FIG. 1, the distance between the inner ball-joints 3 and 4 is dictated solely by the toothed length of the rack 1 as the rack 1 does not slide longitudinally relatively to the casing 2. This distance is thus much less than in known rack and pinion steering arangements.

What I claim is:

1. Steering mechanism for a motor vehicle, the mechanism comprising a rod member, means for fixedly securing said rod member to a motor vehicle, a casing slidable on said rod member, a toothed rack carried by said casing, means for connecting the ends of the toothed rack to the steerable road wheels of a motor vehicle, and a pinion in meshing engagement with the toothed rack, the pinion being connectable to the steering control of a motor vehicle and being rotatable to effect longitudinal movement of said rack and said casing relative to the rod member.

2. Steering mechanism according to claim 1, further comprising ball joint means carried by said casing for connecting the ends of said toothed rack to the steerable road wheels of a motor vehicle.

3. Steering mechanism according to claim 1, further comprising a second casing, said second casing housing said pinion, and means for fixedly securing said second casing to a motor vehicle.

4. Steering mechanism according to claim 1, further comprising seal means fixedly secured to said rod member, a cylinder defined by said first casing and surrounding said rod member and said seal means so as to define with the seal means a closed chamber on each side of the seal means, and means for passing pressure fluid to a selected one of said chambers to provide power assistance in moving said rack and said first casing relative to said rod member.

5. Steering mechanism according to claim 4, said means for passing pressure fluid to either one of said chambers comprising a rotary control valve operatively associated with said pinion and capable of directing pressure fluid to a selected one of said chambers according to the direction of rotation of said pinion.

References Cited

UNITED STATES PATENTS

| 2,865,215 | 12/1958 | Bishop | 180—79.2X |
| 2,867,284 | 1/1959 | Hruska | 180—79.2 |
| 2,978,057 | 4/1961 | Barton et al. | 180—79.2 |

FOREIGN PATENTS

| 852,544 | 10/1960 | Great Britain | 280—96 |
| 911,364 | 11/1962 | Great Britain | 280—96 |

BENJAMIN HERSH, Primary Examiner

L. J. PAPERNER, Assistant Examiner

U.S. Cl. X.R.

280—96